(12) United States Patent
Krishnaswamy et al.

(10) Patent No.: US 11,599,837 B2
(45) Date of Patent: Mar. 7, 2023

(54) METHOD AND SYSTEM FOR SELECTION OF USERS IN FEATURE ROLLOUT

(71) Applicant: MICROSOFT TECHNOLOGY LICENSING, LLC, Redmond, WA (US)

(72) Inventors: Chandramouleeswaran Krishnaswamy, Seattle, WA (US); Rahul Nigam, Bothell, WA (US); Parminder Pal Singh, Redmond, WA (US); Brian Gregory O'Connor, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/137,589

(22) Filed: Dec. 30, 2020

(65) Prior Publication Data
US 2022/0207448 A1 Jun. 30, 2022

(51) Int. Cl.
*G06Q 10/06* (2012.01)
*G06Q 10/0631* (2023.01)
*G06F 8/60* (2018.01)

(52) U.S. Cl.
CPC ......... *G06Q 10/06313* (2013.01); *G06F 8/60* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 7,149,789 B2 | 12/2006 | Slivka et al. | |
| 9,442,715 B2 | 9/2016 | Zhang et al. | |
| 10,185,549 B2 | 1/2019 | Simek et al. | |
| 10,200,446 B2 | 2/2019 | Hui et al. | |
| 10,572,240 B2 * | 2/2020 | Shantharam | G06F 8/65 |
| 10,649,765 B2 | 5/2020 | Kludy | |
| 10,673,955 B2 | 6/2020 | Fransazov et al. | |
| 10,691,445 B2 | 6/2020 | Garg et al. | |

(Continued)

FOREIGN PATENT DOCUMENTS

| | | | | |
|---|---|---|---|---|
| GB | 2554069 A | * | 3/2018 | G06F 8/71 |

OTHER PUBLICATIONS

Khemissa, Sabri et al., Recommendations for IoT Firmware Update Processes, Cloud Security Alliance, 2018 (Year: 2018).*

(Continued)

*Primary Examiner* — Kurtis Gills
(74) *Attorney, Agent, or Firm* — NovoTechIP International PLLC

(57) ABSTRACT

A method of and system for selecting users for a rollout process of a feature is carried out by receiving an indication of the rollout process for the feature being rolled out, accessing a rollout plan, the rollout plan including a plurality of stages for the rollout process, and selecting users from a user population for each of the plurality of stages of the rollout process. Selecting the users from a user population includes examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

20 Claims, 5 Drawing Sheets

(56) References Cited

U.S. PATENT DOCUMENTS

| | | | |
|---|---|---|---|
| 10,915,379 B1 | 2/2021 | Verma et al. | |
| 2012/0102480 A1 | 4/2012 | Hopmann et al. | |
| 2012/0212321 A1* | 8/2012 | Keener | G06Q 10/06 |
| | | | 340/5.8 |
| 2017/0017478 A1* | 1/2017 | Briggs | G06F 9/445 |
| 2017/0132123 A1 | 5/2017 | Ditullio et al. | |
| 2017/0192772 A1* | 7/2017 | Islam | G06F 11/2041 |
| 2018/0203684 A1 | 7/2018 | Shuvali et al. | |
| 2018/0322038 A1* | 11/2018 | Thazhathekalam | |
| | | | G06F 11/3696 |
| 2018/0365131 A1* | 12/2018 | Armitage | G06F 11/3684 |
| 2019/0097825 A1* | 3/2019 | Kan | G06F 16/951 |
| 2020/0019393 A1 | 1/2020 | Vichare et al. | |
| 2020/0019400 A1* | 1/2020 | Zhao | G06F 11/3409 |
| 2020/0104122 A1 | 4/2020 | Pechacek et al. | |
| 2020/0287793 A1* | 9/2020 | Buck | H04L 41/0886 |
| 2020/0379744 A1* | 12/2020 | Bhupati | H04L 67/34 |
| 2020/0403855 A1* | 12/2020 | Sarood | H04L 41/0863 |

OTHER PUBLICATIONS

Cunningham, Paul, "The Debate Over Enabling New Office 365 Features by Default", Retrieved from: https://practical365.com/blog/debate-enabling-new-office-365-features-default/, Mar. 30, 2017, 12 Pages.

Deb, et al., "Under the Hood of Uber's Experimentation Platform", Retrieved from: https://eng.uber.com/xp/, Aug. 28, 2018, 18 Pages.

Holtzman, et al., "Opt in to early access updates", Retrieved from: https://docs.microsoft.com/en-us/power-platform/admin/opt-in-early-access-updates, Sep. 8, 2020, 12 Pages.

Jiang, et al., "Why Tenant-Randomized A/B Test is Challenging and Tenant-Pairing May Not Work", Retrieved from https://www.microsoft.com/en-us/research/group/experimentation-platform-exp/articles/why-tenant-randomized-a-b-test-is-challenging-and-tenant-pairing-may-not-work/, Nov. 4, 2020, 6 Pages.

Kirk, Elliot, "Controlled Feature Roll-outs in Microsoft Edge", Retrieved from: https://techcommunity.microsoft.com/t5/articles/controlled-feature-roll-outs-in-microsoft-edge/m-p/763678/highlight/true#M1358, Jul. 18, 2019, 11 Pages.

Liu, et al., "Enterprise-Level Controlled Experiments at Scale: Challenges and Solutions", In Proceedings Euromicro Conference on Software Engineering and Advanced Applications, Aug. 28, 2019, 10 Pages.

Saveski, et al., "Detecting Network Effects: Randomizing Over Randomized Experiments", In Proceedings of the International Conference on Knowledge Discovery and Data Mining, Aug. 13, 2017, 9 Pages.

Zhao, et al., "Safely and Quickly Deploying New Features with a Staged Rollout Framework Using Sequential Test and Adaptive Experimental Design", In Repository of of arXiv:1905.10493v1, May 25, 2019, 12 Pages.

Ouyang, et al., "Delayed Switch: Cloud Service Upgrade with Low Availability and Capacity Loss", In Proceedings of 5th International Conference on Software Engineering and Service Science, Jun. 27, 2014, pp. 1158-1161.

"International Search Report and Written Opinion Issued in PCT Application No. PCT/US21/058027", dated Feb. 10, 2022, 11 Pages.

Xia, et al., "Safe Velocity: A Practical Guide to Software Deployment at Scale using Controlled Rollout", In Proceedings of 41st International Conference on Software Engineering: Software Engineering in Practice, May 25, 2019, pp. 11-20.

"International Search Report and Written Opinion Issued in PCT Patent Application No. PCT/US22/040015", dated Nov. 3, 2022, 15 Pages.

\* cited by examiner

| STAGES | 1 | 2 | 3 | 4 | 5 | 6 |
|---|---|---|---|---|---|---|
| TIME PERIOD | DAY 1 | DAY 2 | DAY 3 | DAY 4 | DAY 6 | DAY 6 |
| POPULATION SIZE | 5% | 20% | 50% | 75% | 95% | 95% |
| ENTERPRISE POPULATION SIZE | 50% | 49% | 51% | 50% | 49.5% | 50% |
| CONSUMER POPULATION SIZE | 50% | 51% | 49% | 50% | 51.5% | 50% |

METHOD AND SYSTEM FOR SELECTION OF USERS IN FEATURE ROLLOUT

TECHNICAL FIELD

This disclosure relates generally to selection of users for rollout of new features and, more particularly, to an improved method of and system for selecting users for different stages of rolling out a new feature.

BACKGROUND

In recent years, development and improvement of software applications has been occurring more frequently and rapidly. As a result of the rapid development cycle, new features are often developed and rolled out to users frequently. Because a new feature is likely to have unknown defects or design flaws, new features are sometimes not provided to all users at the same time. Instead, a new feature may be rolled out in stages to different groups of users. For example, a small percentage of users may receive the new feature first. Once this group has utilized the feature for a given time period and if they have not encountered significant problems, the feature may be provided to a next group of users. This process may be gradually ramped up until all users receive the new feature. In this manner, if errors and defects are encountered, they can be corrected before the feature is rolled out to other users. As a result, only a fraction of the user group may be affected by potential malfunctions of the new feature.

Part of the process of rolling out new features in stages involves determining which groups of users and/or enterprises receive the new feature at each stage. Today, this is done by randomly selecting a given percentage of users for each stage. As a result, an uneven number of users may be selected from different types of users (e.g., consumer or enterprise). Furthermore, the current mechanisms do not take into account specific circumstances of users or tenants.

Hence, there is a need for improved systems and methods for selecting users for different stages of rolling out a new feature.

SUMMARY

In one general aspect, the instant disclosure describes a data processing system having a processor and a memory in communication with the processor, where the memory comprises executable instructions that, when executed by the processor, cause the data processing system to perform multiple functions. These functions may include receiving an indication of a rollout process for a feature being rolled out, accessing a rollout plan, the rollout plan including a plurality of stages for the rollout process, and selecting users from a user population for each of the plurality of stages of the rollout process. Selecting the users from a user population may include examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

In another general aspect, the instant disclosure describes a method for selecting users for a rollout process of a feature. The method may include receiving an indication of the rollout process for the feature being rolled out, accessing a rollout plan, the rollout plan including a plurality of stages for the rollout process, and selecting users from a user population for each of the plurality of stages of the rollout process. Selecting the users from a user population may include examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

In yet another general aspect, the instant disclosure describes a non-transitory computer readable medium on which are stored instructions that when executed cause a programmable device to receive an indication of a rollout process for a feature being rolled out, access a rollout plan, the rollout plan including a plurality of stages for the rollout process, and select users from a user population for each of the plurality of stages of the rollout process. Selecting the users from a user population may include examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is an example plan for a staged rollout of a new feature.

DETAILED DESCRIPTION

Figure 1:
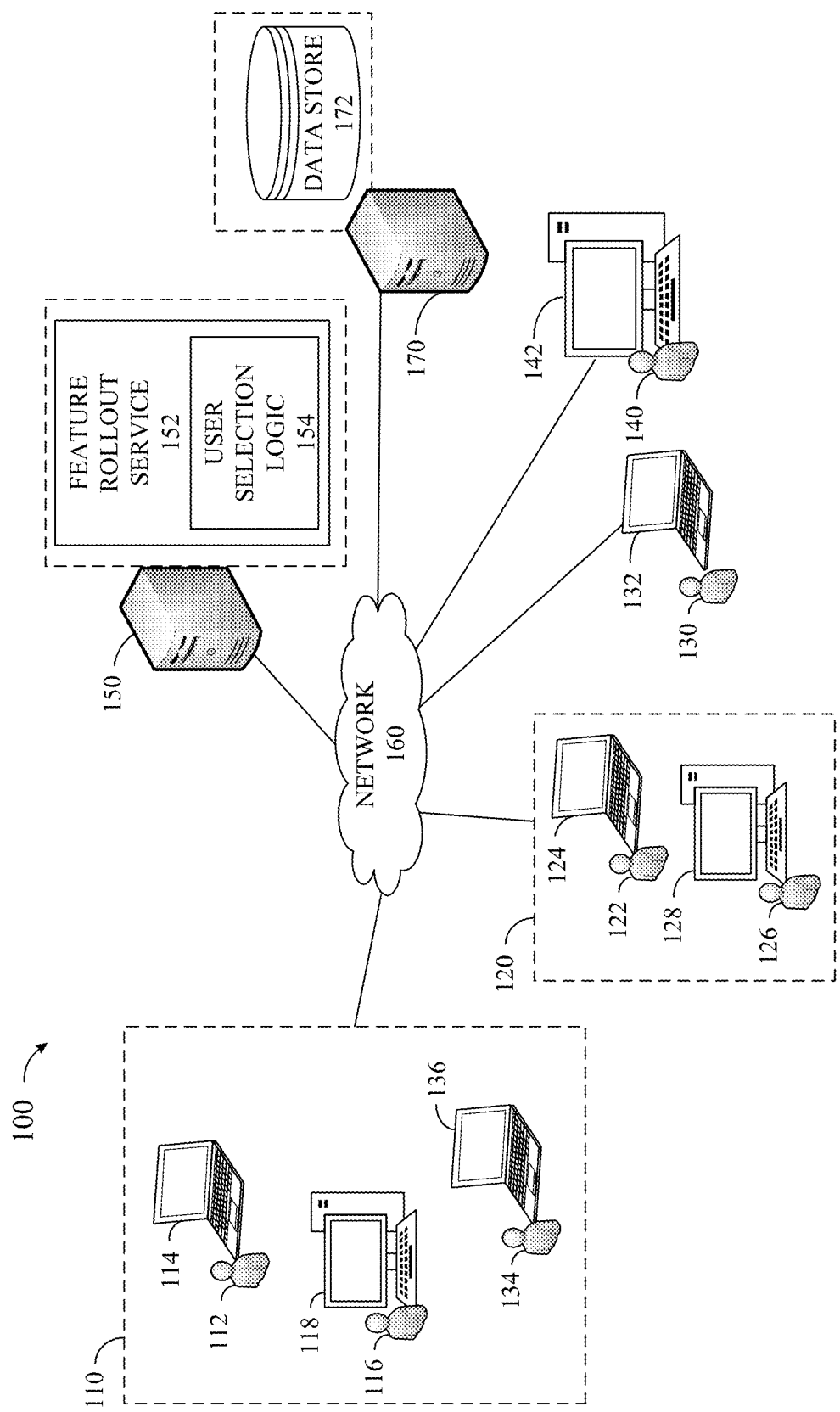
FIG. 1 illustrates an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

When a new feature becomes available for use, development teams often rollout the feature in multiple stages to reduce the risks associated with exposing a large number of users to the new feature. For example, the feature may be rolled out to different groups of users at staggered time intervals to ensure significant errors or issues are caught and addressed before the feature is exposed to all users. Under this framework, exposure of the new feature may be gradually expanded from a small proportion of users to a larger population based on evaluation of the feature's performance. The process of performing a staged rollout includes selecting a group of users to whom the feature is exposed at each stage of the rollout. Currently, users and/or tenants are often selected at random and/or they are selected based on parameters relating to testing capacity of the user/enterprise (e.g., the number of users and the like). However, this process does not take into account the type of user. As a result, an uneven number of consumer and enterprise users may be selected at different stages. While this may be desirable for some of the rollout stages, it may not be optimal for other stages (e.g., late stages). For example, having an uneven distribution of users may be problematic as consumer and enterprise users may have different types of uses for the feature and as such may encounter different errors. Thus, there exists the technical problem of ensuring equal distribution of different types of users during some stages of the rollout process.

Furthermore, certain users and/or enterprises may have specific needs. For example, an enterprise may have had significant computer problems recently (e.g., the past two weeks) and may need to avoid potential exposure to new features while the current issues are resolved. In another example, a tenant may have a deadline for completing an important project and may need to avoid exposure to potential problems during the time period leading up to the deadline. In yet another example, certain users (e.g., users of an enterprise or consumers) may have a history of encountering errors with new features, and as such may desire to avoid early exposure to a new feature. However, the current process for selection of users for the different rollout stages, does not provide a mechanism for users and/or enterprises to submit a request to be excluded from the early stages of rollouts. Furthermore, current mechanisms do not provide a way for excluding users based on the type of tenant. Thus, there exists the technical problem of not being able to easily exclude certain tenant types from exposure to early rollout stages.

To address these technical problems and more, in an example, this description provides a technical solution for preventing certain tenants from being exposed to a new feature at an early stage of the rollout for the new feature. Furthermore, this disclosure provides a technical solution for ensuring that the randomization of user and/or enterprise selections results in a substantially equal distribution of different types of users for one or more stages. To enable certain users and/or enterprises to submit a request for being excluded from early exposure to new features, mechanisms may be provided to enable a user and/or enterprise to opt out of receiving new features at an early stage. This may involve making a request to exclude certain users from receiving new features and/or making a request to not receive new features in a specific time period. Furthermore, mechanisms may be employed to identify users and/or enterprises that fall within one or more specific categories of tenant types and ensure those tenant types receive new features at a late stage of the rollout. As a result, the solution provides an efficient mechanism for selecting users and/or enterprises for different stages of the rollout which takes into account user/enterprise needs and ensures equal distribution of different types of users during one or more stages of the rollout process.

As will be understood by persons of skill in the art upon reading this disclosure, benefits and advantages provided by such implementations can include, but are not limited to, increased user and/or tenant satisfaction and more accurate rollout feedback. Technical solutions and implementations provided here optimize and improve the manner of selecting users and/or tenants for different stages of the rollout process. The benefits provided by these solutions include providing increased accuracy and consumer satisfaction. Furthermore, the technical solutions improve the process of feature rollout and as such improve implementation of new applications, thus improving operation of computer devices.

As used herein, the term "feature" may refer to any change to a software application that involves a code or configuration change. The change can happen either in the client codebase, or in the backend codebase on the server. A feature can be as large as an application redesign, and as small as a few lines of code or configuration change which is not visible to users. Furthermore, as used herein, "rollout" may refer to the process of exposing a new feature to a user population. The rollout process may start with no users having exposure to the new feature and end with the feature being available to all users. The term "staged rollout" may refer to the breaking of the rollout process into different stages, with each stage having a different proportion of the user population exposed to the new feature. A "software application" (or "application") may refer to any computer program designed to perform a group of coordinated functions, tasks, or activities, such as, antivirus application, productivity suite, media creation application, and the like. The term "end stage" may refer to the last stage of the rollout process.

FIG. 1 illustrates an example system 100, upon which aspects of this disclosure may be implemented. The system 100 may include a plurality of enterprise tenants, including a first enterprise tenant 110 and a second enterprise tenant 120, as well as a plurality of consumer tenants including a first consumer tenant 130 and a second consumer tenant 140. Each of the enterprise tenants may include a plurality of users each having one or more client devices. For example, the tenant 110 may include a user 112 associated with (e.g., in possession of or using) a client device 114, a user 116 associated with a client device 118 and a user 134 associated with a client device 136. Similarly, the tenant 120 may include a user 122 associated with a client device 124 and a user 126 associated with a client device 128. Each of the consumer tenants may also be associated with a client device. For example, consumer tenant 130 may be associated with the client device 132 and consumer tenant 140 may be associated with the client device 142. In some implementations, two or more tenants form a cluster (not shown).

The system 100 may also include a server 150 which may contain and/or execute a feature rollout service 152. The server 150 may operate as a shared resource server located at an enterprise accessible by various tenant client devices such as client devices 114, 118, 124, 128, 132, 136, and 142. The server 150 may also operate as a cloud-based server for providing feature rollout services. Although shown as one server, the server 150 may represent multiple servers for performing various different operations. For example, the server 150 may include one or more processing servers for performing the operations of the feature rollout service 152 and user selection logic 154.

The feature rollout service 152 may provide for staged rollout of one or more new features. For example, the rollout service 152 may have access to information regarding the users and/or enterprises to which a new feature may apply (e.g., users and/or enterprises that use an application to which the feature applies). This information may be stored locally in the server 150 or it may be stored in a storage server 170 containing a data store 172. The data store 172 may function as a repository in which information relating to rollout of new features to users and/or enterprises may be stored. This information may include various metrics such as the number of users in each enterprise, client devices and applications used by each user, the amount of time spent on each application, the number of incidents reported by each enterprise and/or consumer, parameters relating to enterprises and the like. Furthermore, the data store 172 may include information about a parameter indicating a user and/or enterprise request to opt out of early exposure to new features and/or a time period for the duration of the request. In some implementations, the data store 172 may function as a directory (e.g., an active directory) of users and the server 150 may operate as a directory server.

The rollout service 152 may utilize the stored information and/or data relating to the new feature to determine the number of rollout stages, the percentage of users at each stage and/or the time period for each stage. Once specifics about the rollout stages has been determined, the rollout service 152 may utilize the user selection logic 154 to choose a number of enterprises, users within the selected enterprises and/or consumers for each stage of the rollout. This may involve examining the parameter relating to whether a consumer and/or enterprises request to opt out of early exposure to new features has been received. The process may also include examining other metrics to determine if a user and/or enterprise should be excluded from exposure to new features.

Various elements of the system 100 may be connected to each other via the network 160. The network 160 may be one or more wired or wireless networks or a combination of wired and wireless networks. The system 100 may be implemented in a single site or spread out in a number of buildings or geographically separated locations.

The client devices 114, 118, 124, 128, 132, 136, and 142 may include any stationary or mobile computing device configured to communicate via the network 160. For example, the client devices may include workstations, desktop computers, laptop computers, tablets, phablets, smart phones, cellular phones, personal data assistants (PDA), printers, scanners, telephone, televisions smart watches, wearable computers, gaming devices/computers, head-mounted display devices or any other device that can be subject to software/hardware changes. The internal hardware structure of a client device is discussed in greater detail in regard to FIGS. 4 and 5. While it is possible for a very few of the client devices to have exactly the same hardware/software configurations, most of the client devices may have a unique hardware/software configuration that can be drastically different from other client devices.

It should be noted that although only a few client devices are shown in each tenant in FIG. 1, the actual number of client devices in each tenant 110 and 120 may vary depending on the size and type of the organization. For example, large enterprises may include hundreds or thousands of users and client devices, which may be spread out in different geographical locations. Furthermore, while only two enterprises and two consumers are depicted, an actual system 100 may include many more enterprises and consumers.

FIG. 2 illustrates an example rollout plan 200 for a staged rollout of a new feature. The rollout plan 200 includes 6 rollout stages, each having a time period of one day, such that the entire rollout period takes six days. The number of rollout stages and the time period for each may depend on a number of factors such as the complexity of the new feature (e.g., low risk, high risk, etc.), the total number of users and/or enterprises (e.g., enterprises, enterprises users and consumers) to which the new feature applies, the metrics by which success or failure of the rollout would be determined, and others. The number of stages and the time period for each stage may be determined by a feature rollout service such as the feature rollout service 152 of FIG. 1. Although, all stages are shown as taking the same amount of time, in some implementations, some stages may take more time. For example, there may be more time allocated to the first few stages to ensure a majority of errors are caught in the early stages.

In addition to the number of stages and their time periods, the rollout plan 200 may include the population size for each stage. The population size may be determined by a feature rollout service such as the feature rollout service 152 of FIG. 1. In an example, the population size is determined by a user selection logic such as the user selection logic 154. The population size for each stage may depend on a variety of factors which may include tenant metrics, parameters relating to the new feature, and the like. In some implementations, the population size may be a set number and may depend on the number of stages. For example, the total percentage may be equally divided among the number of stages (e.g., 100% divided by 6 stages). In other implementations, the last stage would include a certain percentage of the population. For example, 5% may be allocated to the last stage. Thus, the population size gradually increases from the first stage to the last stage such that by the last stage, 100% of the user population is exposed to the new feature. This is because at each stage, an additional percentage of the user population is exposed to the new feature. In the rollout plan 200, first, 5% of the population is exposed to the new feature at stage 1. Next, the percentage is increased to 20% of the population at stage 2 (e.g., 15% more than stage 1). The percentage is gradually increased to 50% in stage 3, 75% in stage 4, 95% in stage 5 and finally 100% in stage 6. Thus, during the last stage of the rollout plan 200 (e.g., end stage) 5% of the user population is exposed to the new feature. This population may be referred as the late-stage or end-stage population and may include those users and/or enterprises who have opted into the late stages of the rollout.

To ensure the population exposed to the new feature is equally distributed between the different types of users, when applicable, the user type may be taken into account when selecting users for each of the stages. Thus, care may be taken to ensure that, when users are selected, a substantially equal proportion is selected from each user type. It should be noted that in some instances, it may not be desirable to have an equal distribution. For example, for some features, it may be more appropriate to expose the new feature to enterprise users first. In these situations, the first few stages may be reserved for enterprise users or a larger proportion of enterprise users may be selected than consumer users. Furthermore, in some cases it may not be feasible to get an exactly equal distribution between the user types, consumer and enterprise. In those situations, the distribution may be as close to equal as possible. For example, in the rollout plan 200, when 50% distribution between consumer and enterprise users is not possible, the numbers remain close to 50%. It also be noted that although only enterprise and consumer users are mentioned in FIG. 2, other types of users may exist. For example, the directory may also include a list of online users (e.g., users who use online applications and services such as Microsoft OneDrive consumers).

Figure 3:
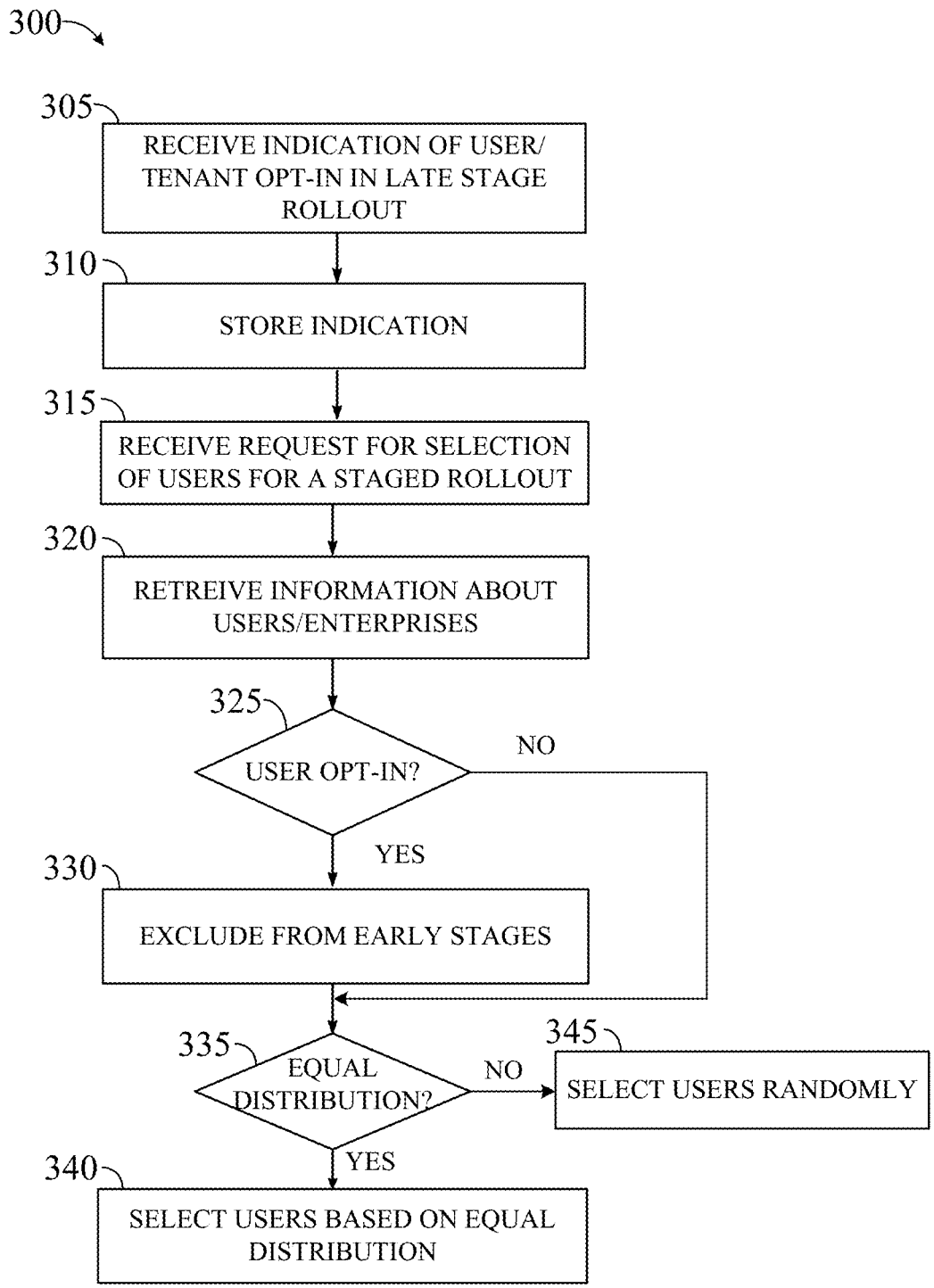
FIG. 3 is a flow diagram showing an example method for selecting users for different stages of a new feature rollout.

FIG. 3 is a flow diagram depicting an example method 300 for selecting users for different stages of a new feature rollout. In an example, one or more steps of method 300 may be performed by a backend server such as the server 150 of FIG. 1. For example, some steps may be performed by a feature rollout service such as the feature roll out service 152 of FIG. 1, while other steps may be performed by a user selection logic such as the user selection logic 154 of FIG. 1.

At 305, the method 300 may begin by receiving an indication of a user opting-in into late stages of the rollout. The indication may be received directly from a user, for example from a tenant portal. In an example, each user (e.g., consumer or enterprise) may have access to an application having a user interface (e.g., a portal) that provides an option for choosing to opt-in to the late stages of feature rollouts. For example, the user may check a box indicating a desire to activate late-stage rollout. In some implementations, the user may be able to and/or may be required to set a time limit for the duration of the late-stage rollout. This may be beneficial, when the user needs assurance that their client device(s) will not undergo changes during a specific time period (e.g., when they are working on an important project).

In an enterprise, each user may be able to submit a request for late-stage rollout via their client device. An enterprise administrator may be able to review these requests, approve or deny them, and then submit an indication, based on the user requests, to the rollout service. The indication may include user identifications for the users for which late-stage rollout is requested. In some implementations, the enterprise administrator may initiate the request by themselves. For example, they may identify a number of users that, for various reasons, should not be exposed to early stages of a rollout. For example, certain users may be identified as having a volume of complaints and/or issues (e.g., with their client devices or applications they use). Other users may be identified as being responsible for important and/or time sensitive project and as such may not be able to afford being exposed to faulty features. An administer may identify these users and submit a request to the rollout service to opt-in the specific users into late-stage rollout.

In some implementations, the administer is able to submit a request to opt-in the entire enterprise into late-stage rollout. This may require a time restriction to ensure the enterprise participates in early-stage rollouts in the future. For example, if an enterprise has specific needs for a given time period (e.g., the next month), they may submit a request to opt-in the enterprise into late-stage rollout for the given time period. In some implementation, the time period cannot be longer than a predetermined threshold (e.g., no more than 6 weeks).

In an alternative implementation, a time restriction does not apply to certain types of enterprises. For example, an enterprise being considered as a high value client (e.g., having a significantly large number of user or paying additional fees for opting into late-stage or end-stage rollout) may be able to bypass the time restrictions.

In addition to the user and/or enterprise directly making a requesting to opt-in, the rollout service may by itself identify certain users and/or enterprises as falling into the opt-in category. This may be determined based on a variety of parameters such as the number of complaints received from the user and/or enterprise, being considered a high value client (e.g., having paid an extra fee), the number of users in an enterprise, tenant health metrics (e.g., ungraceful program exits by users) and the like. All these factors may be taken into account to determine if a user and/or enterprise should be designated as a high value and/or critical watch client. This may be determined automatically or manually. For example, a customer team administrator may review tenant metrics and categories a tenant as a critical watch client. Once the determination is made, a property associated with this category may be set to true to ensure the designated users and/or enterprises are exposed to new features at the late stages of the rollout (e.g., late stage or end stage).

Once the indication is received that a user and/or enterprise has requested to be or has been identified as a late stage (or end stage) receiver of new features, this information may be stored in a data set for future use, at 310. For example, a parameter may be set for the user and/or enterprise in a database identifying various users and/or enterprises. This may be stored in a storage server accessible to the rollout server (e.g., data store 172 of storage server 170 of FIG. 1). The parameter may be associated with the type of user. For example, the parameter may identify the user and/or enterprise as a late-stage or end-stage receiver or the parameter may simply identify the type of tenant (e.g., critical watch, consumer, education (EDU), and the like). When the parameter identifies an enterprise as a late-stage or end-stage receiver, all users of that enterprise may automatically be designated as late-stage or end-stage receivers.

After storing the user and/or enterprise parameter, method 300 may proceed to receive a request for selection of users for a staged rollout, at 315. The request may be received after a request for a feature flight has been received. This may occur, when a feature flight server (which may be the same or may be included in the feature rollout server) transmits a request for initiating rollout of a new feature. This may be done by using a flight Application Program Interface (API). Once the request for initiating the rollout has been received, a request for selection of users may be made as part of the process of preparing a rollout plan (e.g., number of stages, population sizes for each stage and the like) for a new feature. Alternatively, the request may be received after a rollout plan has been prepared. In some implementation, instead of receiving a request for selection of users, the selection process begins automatically as part of the rollout plan.

Once it is determined that user selection needs to be made, method 300 may proceed to retrieve information about the various users and/or enterprises, at 320. This information may include a variety of parameters such as the applications the users utilize to determine if the new feature applies to the users. Furthermore, the information may include the user type (e.g., consumer or enterprise) and tenant type (e.g., whether or not the user falls into the late or end stage categories). Thus, the data stored about late or end stage opt-in may be retrieved to assist in selecting the users for each stage.

Method 300 may then proceed to examine the users and/or enterprises to determine which one(s) are identified as a late or end stage user, at 325. When it is determined that a user and/or enterprise qualifies as a late or end stage user (yes at 325), method 300 may proceed to exclude the user and/or enterprise from the early stages of the rollout, at 330. This may involve removing the user and/or enterprise form the list of users and/or enterprises from which a selection may be made for the first few stages of the rollout. In some implementations, the process of examining the user and/or enterprises to determine if they are late or end stage users (step 325) may be repeated until all late or end stage users are identified. In other implementations, excluding the user and/or enterprise from early stages may simply mean that the selection mechanisms check the parameter associated with late or end stage users before selecting a user and/or enterprise for the early stages.

In practice to exclude certain users, one or more flight rollout configuration policies may be revised to include a revised rotation detail based on the tenant type. For example, the flight configuration generator may be revised to support a tenant stage. This may be done to add a new rotation type based ono the tenant stage. Furthermore, a new case may be added to the flight configuration utility to support the new rotation type. Cases may also be added to the flight configuration to support searching flight types. In an example, the resulting flight configuration may be as follows:
NumberLine=FlightName
Enabled=true
Rotate&FarmLabel: "US_17_Content"=100%
Rotate&FarmLabel: "US_17_FederatedCore"=100%
Rotate&FarmLabel: "US_17_FederatedSearch"=100%
Rotate&TenantReleaseTrack: "After50Stage1e"=norotate
Rotate&UserReleaseTrack: "After50Stage2"=norotate
Rotate=norotate
FlightType=SharePoint In some implementations, a new variant type may be introduced in VariantType.cs as follows.
public const string TenantStage="TenantStage"
Furthermore, a new enum may be added to support TenantStage as shown below.

```
public enum SPFlightingTenantStage
{
    Default = 0,
    After50Stage1 = 1,
    After50Stage2 = 2
}
```

In an example, the translation of the flighting enum to the SPTenantType may be done as follows.

```
public enum SPTenantType
{
Default = 0,
S400 = 1, //After50Stage2
EngineeringDirect = 2,
CWL = 3,
Edu = 4,
Freemium = 5,
ConsumerTenant = 6 //After50Stage1
```

In some implementations, critical watch tenants are treated differently from other tenant types. For example, critical watch tenants may retain their critical watch status for a specific time period. In an example, one or more administrators responsible for managing the directory (e.g., active directory) or other types of administrators (e.g., a customer team) maintain a database with information on critical watch tenants. For example, the administrators may review customer complaints, requests (e.g., opt-in request) and the like and determined based on those parameters if a customer should be designated a critical watch customer. The administrators may maintain a list of critical watch customers. In an example, a Web API is used to retrieve a list of critical watch customers. During configuration generation, the critical watch clients may be queried using the WebAPI. Then, when a flight rollout is initiated, if there is a critical watch tenant, the configuration may be appended with Rotate&Tenant:<TenantId>=norotate to ensure the critical watch client is excluded from selection.

When it is determined that a user and/or enterprise is not identified as a late or end stage user or when all late or end stage users and/or enterprises have been identified (no at 325) and after late or end stage users have been excluded at 330, method 300 may proceed to determine if equal distribution between different types of users (e.g., consumer and enterprise) is desired. This is because depending on the feature, the developers may choose to expose the feature to both consumers and enterprise users equally. For some features, equal distribution may only be desired for later stages of the rollout. For example, the first few stages may be applied only to enterprise users, while the later stages may be equally applied to both consumer and enterprise users. In some implementations, online users are also included in the collection of users to whom the feature is exposed during the rollout stages. To achieve that, online users may be registered in the directory of users (e.g., active directory). Once included in the directory, online users may be selected in later stage of the rollout process.

To establish equal distribution for the later stages, the rollout configuration may be revised from not having rotation enabled for consumer and/or online users to enabling rotation based on the user. An example configuration for stage 14 of an example rollout process is provided below.
NumberLine=FlightName
Enabled=true
Rotate&FarmLabel: "US_17_Content"=100%
Rotate&FarmLabel: "US_17_FederatedCore"=100%
Rotate&FarmLabel: "US_17_FederatedSearch"=100%
Rotate&TenantReleaseTrack: "FirstRelease"=100%
Rotate&UserReleaseTrack: "StagedRolloutOne"=100%
RotateOn=User
Rotate=0,499
FlightType=SharePoint
This ensures that when new feature exposures are rotated between users, enterprise, consumer and online users are included.

In some implementations, enterprises prefer to provide the same consistent experience to all their users (e.g., across a tenant). As such, when feature rollouts occur, an enterprise may desire to enable all of their users for selection. This is in contrast to the interests of online users. To provide online and enterprise users different experiences, an online specific policy may be implemented. An example Online (e.g., OneDrive (ODC)) specific configuration for stage 5 of an example rollout process is provided below.
[MyFeatureFlight]
_meta.type=Microsoft.SharePoint.Flighting.IFlight
NumberLine=MyFeatureFlight
Enabled=true
Rotate&Tenant: <ODCTenantID>=10%
Rotate=norotate
Rotateon=user In order to meet the requirements of both online users and consumers, another option may be selected which may require changes in policy definition, configuration generation and the final configuration for a rollout. This change may enable rotation on users for consumer tenants, while allowing online users to participate as first release tenants (e.g., users that are early-stage receivers). An example revised configuration for stage 9 of an example rollout process is provided below.

[FlightName]
_meta.type=Microsoft.SharePoint.Flighting.IFlight
NumberLine=FlightName
Enabled=true
Rotate&FarmLabel: "US_17_Content"=100%
Rotate&FarmLabel: "US_17_FederatedCore"=100%
Rotate&FarmLabel: "US_17_FederatedSearch"=100%
Rotate&TenantReleaseTrack: "FirstRelease"=10%
Rotate&UserReleaseTrack: "StagedRolloutOne"=10%
Rotate&Tenant: "4c8b852c-b17a-4054-bced-40103ec90454"=10%
RotateOn&Tenant: "4c8b852c-b17a-4054-bced-40103ec90454"=User
RotateOn=Tenant
Rotate=norotate
FlightType=SharePoint The above configuration changes ensure that online users can be exposed to new features, when needed, and when consumers can be exposed to the new features (e.g., later stages), the population size is equally distributed between enterprise and consumer users.

Figure 4:
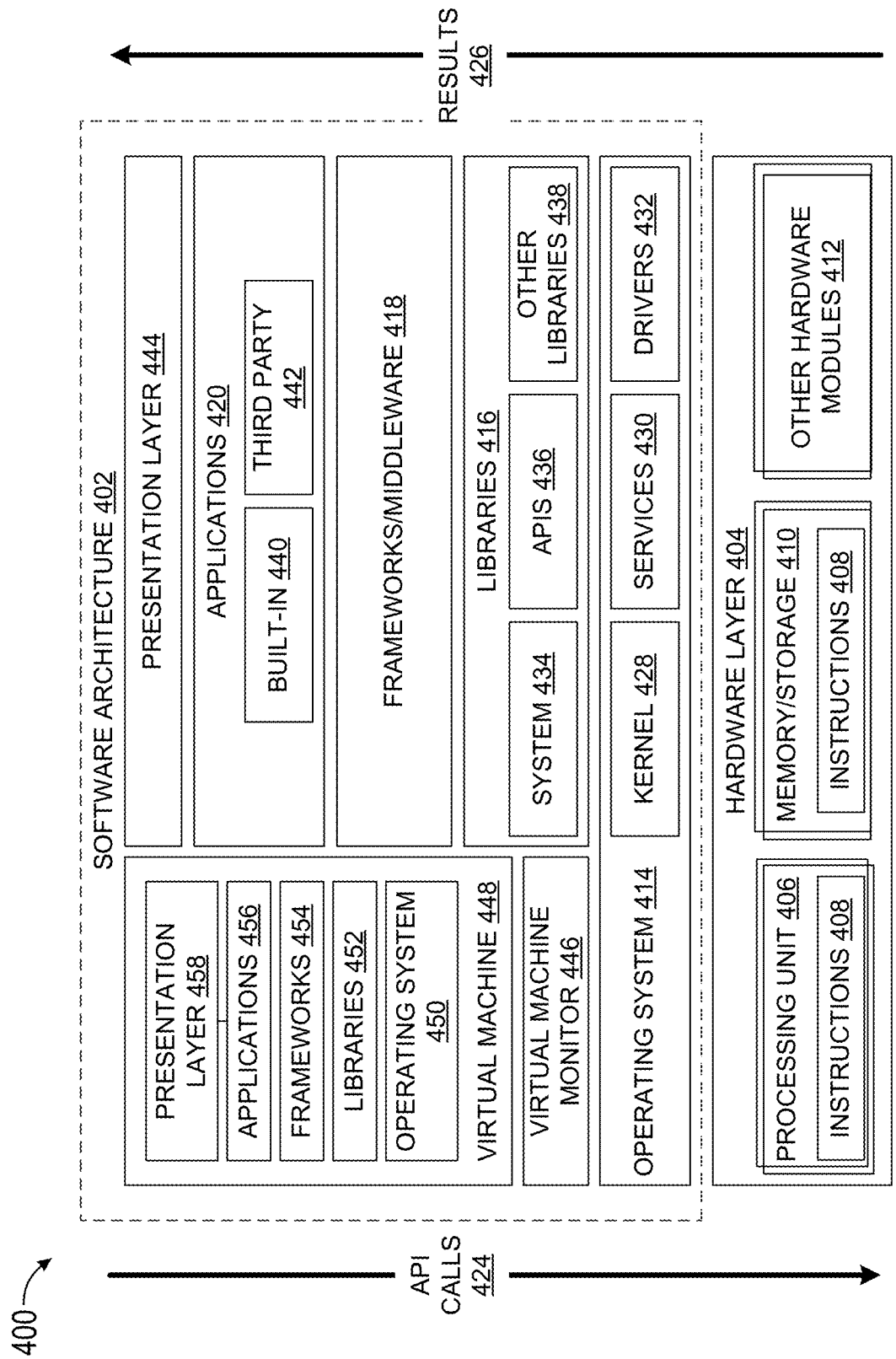
FIG. 4 is a block diagram illustrating an example software architecture, various portions of which may be used in conjunction with various hardware architectures herein described.

FIG. 4 is a block diagram 400 illustrating an example software architecture 402, various portions of which may be used in conjunction with various hardware architectures herein described, which may implement any of the above-described features. FIG. 4 is a non-limiting example of a software architecture and it will be appreciated that many other architectures may be implemented to facilitate the functionality described herein. The software architecture 402 may execute on hardware such as client devices, native application provider, web servers, server clusters, external services, and other servers. A representative hardware layer 404 includes a processing unit 406 and associated executable instructions 408. The executable instructions 408 represent executable instructions of the software architecture 402, including implementation of the methods, modules and so forth described herein.

The hardware layer 404 also includes a memory/storage 410, which also includes the executable instructions 408 and accompanying data. The hardware layer 404 may also include other hardware modules 412. Instructions 408 held by processing unit 406 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular system. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine depicted in block diagram 600 of FIG. 6, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 450, libraries 452, frameworks 454, applications 456, and/or a presentation layer 458.

Figure 5:
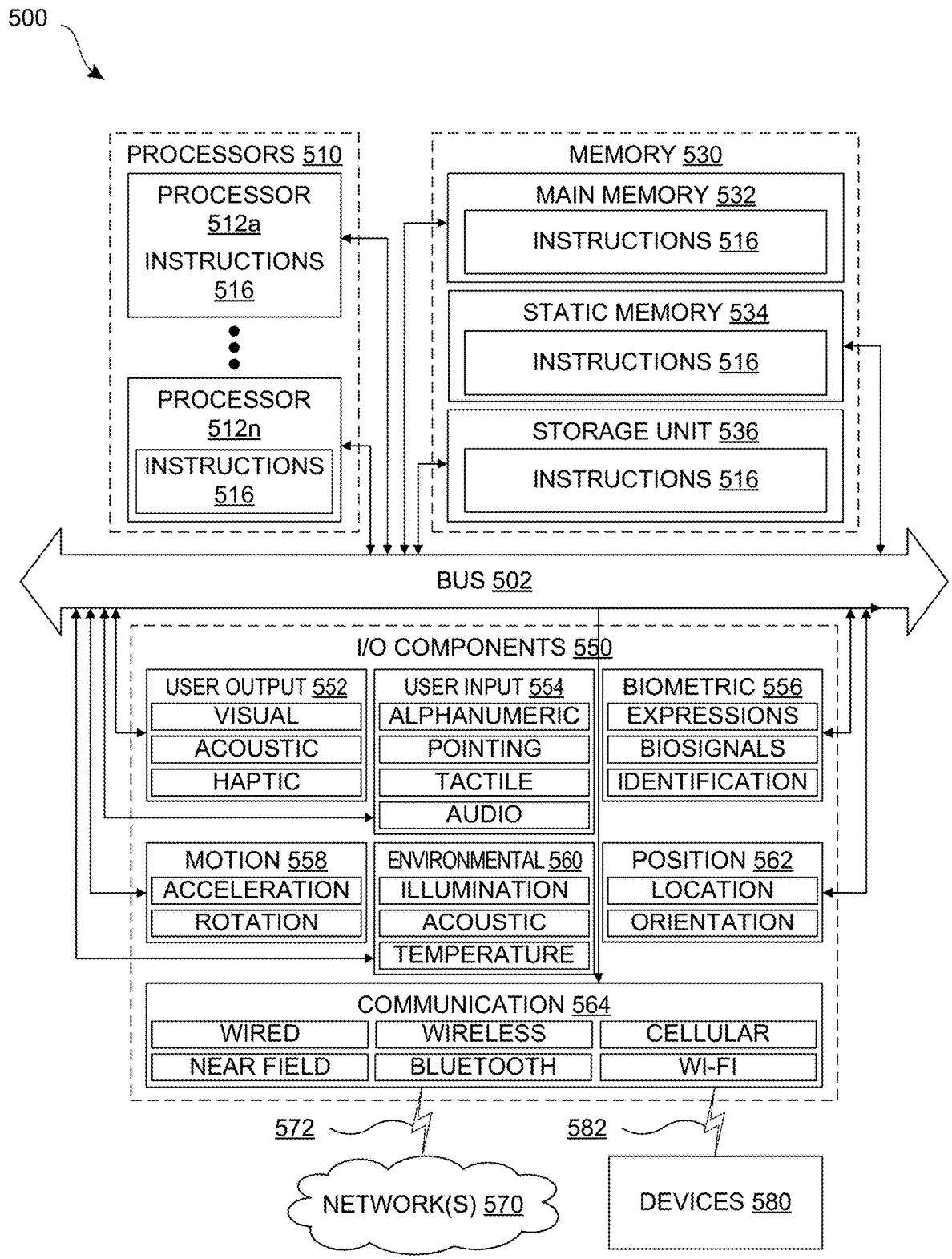
FIG. 5 is a block diagram illustrating components of an example machine configured to read instructions from a machine-readable medium and perform any of the features described herein.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement methods or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The particular examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560 and/or position components 562, among a wide array of other environmental sensor components. The biometric components 556 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 562 may include, for example, location sensors (for example, a Global Position System (GPS) receiver), altitude sensors (for example, an air pressure sensor from which altitude may be derived), and/or orientation sensors (for example, magnetometers). The motion components 558 may include, for example, motion sensors such as acceleration and rotation sensors. The environmental components 560 may include, for example, illumination sensors, acoustic sensors and/or temperature sensors.

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving an indication of a rollout process for a feature being rolled out;
accessing a rollout plan, the rollout plan including a plurality of stages for the rollout process; and
selecting users from a user population for each of the plurality of stages of the rollout process,
wherein selecting the users from a user population includes:
examining a property to determine if a user in the user population is indicated as opted into being a late-stage receiver, and
upon determining that the user is opted into being the late-stage receiver, excluding the user from the user population for one or more early stages of the rollout and including the user into the user population in one or more late stages of the rollout process.

Item 2. The data processing system of item 1, wherein the property is set based on a user selection opting into late-stage rollout.

Item 3. The data processing system of items 1 or 2, wherein the property is set via a tenant portal accessible to an enterprise administrator or consumer.

Item 4. The data processing system of any preceding item, wherein the property is determined based on one or more user parameters.

Item 5. The data processing system of any preceding item, wherein the user population includes at least one of enterprise users, consumers, and online users.

Item 6. The data processing system of claim 5, wherein selecting the users from the user population includes, for at least one of the plurality of stages, selecting the users such that the selected users include a substantially equal distribution between the enterprise users and the consumers.

Item 7. The data processing system of any preceding item, wherein the property is associated with a predetermined time period during which the user is indicated as being a late-stage receiver.

Item 8. A method for selecting users for a rollout process of a feature, comprising:
receiving an indication of the rollout process for the feature being rolled out;
accessing a rollout plan, the rollout plan including a plurality of stages for the rollout process; and
selecting users from a user population for each of the plurality of stages of the rollout process,
wherein selecting the users from a user population includes:

examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

Item 9. The method of item 8, wherein the property is set based on a user selection opting into late-stage rollout.

Item 10. The method of items 8 or 9, wherein the property is set via a tenant portal accessible to an enterprise administrator or consumer.

Item 11. The method of any of items 8-10, wherein the property is determined based on one or more user parameters.

Item 12. The method of any of items 8-10, wherein the user population includes at least one of enterprise users, consumers, and online users.

Item 13. The method of item 12, wherein selecting the users from the user population includes, for at least one of the plurality of stages selecting the users such that the selected users include a substantially equal distribution between the enterprise users and the consumers.

Item 14. The method of any of items 8-13, wherein the property is associated with a predetermined time period during which the user is indicated as being a late-stage receiver.

Item 15. A non-transitory computer readable medium on which are stored instructions that when executed cause a programmable device to:

receive an indication of a rollout process for a feature being rolled out;

access a rollout plan, the rollout plan including a plurality of stages for the rollout process; and select users from a user population for each of the plurality of stages of the rollout process, wherein selecting the users from a user population includes:

examining a property to determine if a user in the user population is indicated as opted into being a late-stage receiver, and upon determining that the user is opted into being the late-stage receiver, excluding the user from the user population for one or more early stages of the rollout and including the user into the user population in one or more late stages of the rollout process.

Item 16. The non-transitory computer readable medium of item 15, wherein the property is set based on a user selection opting into late-stage rollout.

Item 17. The non-transitory computer readable medium of items 15 or 16, wherein the property is set via a tenant portal accessible to an enterprise administrator or consumer.

Item 18. The non-transitory computer readable medium of any of items 15-17, wherein the property is determined based on one or more user parameters.

Item 19. The non-transitory computer readable medium of item 18, wherein selecting the users from the user population includes, for at least one of the plurality of stages selecting the users such that the selected users include a substantially equal distribution between enterprise users and consumers.

Item 20. The non-transitory computer readable medium of any of items 15-19, wherein the property is associated with a predetermined time period during which the user is indicated as being a late-stage receiver.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving, via a portal, a request to opt at least one of a user or an enterprise into being a late-stage receiver for a feature, wherein the request sets a time period during which the user or the enterprise will be a late-stage receiver for the feature;
in response to receiving the request, setting a configuration property value associated with the user or the enterprise to a late-stage receiver for the feature;
receiving a request from a feature rollout server for rolling out the feature;
accessing a rollout plan, by the processor, the rollout plan including a plurality of stages for rolling out the feature; and
selecting users from a user population for each of the plurality of stages of the rollout process,
wherein selecting the users from the user population includes:
examining, by the processor, the configuration property value to determine that the user in the user population is indicated as opted into being a late-stage receiver, and
upon determining that the user is opted into being the late-stage receiver, excluding the user from the user population for one or more early stages of rolling out the feature and including the user into the user population in one or more late stages of the rollout process.

2. The data processing system of claim 1, wherein the configuration property value is set based on a user selection of opting into late-stage rollout.

3. The data processing system of claim 1, wherein the configuration property value is set via a tenant portal accessible to an enterprise administrator or a consumer.

4. The data processing system of claim 1, wherein the configuration property value is determined based on one or more user parameters.

5. The data processing system of claim 1, wherein the user population includes at least one of enterprise users, consumers, and online users.

6. The data processing system of claim 5, wherein selecting the users from the user population includes, for at least one of the plurality of stages, selecting the users such that the selected users include a substantially equal distribution between the enterprise users and the consumers.

7. The data processing system of claim 1, wherein the configuration property value is associated with a predetermined time period during which the user is indicated as being a late-stage receiver.

8. A method for selecting users for a rollout process of a feature, comprising:
receiving, via a portal, a request to opt at least one of a user or an enterprise into being a late-stage receiver for the feature, wherein the request sets a time period during which the user or the enterprise will be a late-stage receiver for the feature;
in response to receiving the request, setting a configuration property value associated with the user or the enterprise to a late-stage receiver for the feature;
receiving a request from a feature rollout server for rolling out the feature;
accessing a rollout plan, by a processor, the rollout plan including a plurality of stages for rolling out the feature; and
selecting users from a user population for each of the plurality of stages of the rollout process,
wherein selecting the users from the user population includes:
examining, by the processor, the configuration property value to determine that the user in the user population is indicated as opted into being a late-stage receiver, and
upon determining that the user is opted into being the late-stage receiver, excluding the user from the user population for one or more early stages of rolling out the feature and including the user into the user population in one or more late stages of the rollout process.

9. The method of claim 8, wherein the configuration property value is set based on a user selection of opting into late-stage rollout.

10. The method of claim 8, wherein the configuration property value is set via a tenant portal accessible to an enterprise administrator or a consumer.

11. The method of claim 8, wherein the configuration property value is determined based on one or more user parameters.

12. The method of claim 8, wherein the user population includes at least one of enterprise users, consumers, and online users.

13. The method of claim 12, wherein selecting the users from the user population includes, for at least one of the plurality of stages selecting the users such that the selected users include a substantially equal distribution between the enterprise users and the consumers.

14. The method of claim 8, wherein the configuration property value is associated with a predetermined time period during which the user is indicated as being a late-stage receiver.

15. A non-transitory computer readable medium on which are stored instructions that when executed cause a programmable device to:
receive, via a portal, a request to opt at least one of a user or an enterprise into being a late-stage receiver for a feature, wherein the request sets a time period during which the user or the enterprise will be a late-stage receiver for the feature;
in response to receiving the request, set a configuration property value associated with the user or the enterprise to a late-stage receiver for the feature;
receive a request from a feature rollout server for rolling out the feature;
access a rollout plan, by a processor, the rollout plan including a plurality of stages for rolling out the feature; and
select users from a user population for each of the plurality of stages of the rollout process,
wherein selecting the users from the user population includes:
examining, by the processor, the configuration property value to determine that the user in the user population is indicated as opted into being a late-stage receiver, and
upon determining that the user is opted into being the late-stage receiver, excluding the user from the user population for one or more early stages of rolling out the feature and including the user into the user population in one or more late stages of the rollout process.

16. The non-transitory computer readable medium of claim 15, wherein the configuration property value is set based on a user selection of opting into late-stage rollout.

17. The non-transitory computer readable medium of claim 15, wherein the configuration property value is set via a tenant portal accessible to an enterprise administrator or a consumer.

18. The non-transitory computer readable medium of claim 15, wherein the configuration property value is determined based on one or more user parameters.

19. The non-transitory computer readable medium of claim 18, wherein selecting the users from the user population includes, for at least one of the plurality of stages selecting the users such that the selected users include a substantially equal distribution between enterprise users and consumers.

20. The non-transitory computer readable medium of claim 15, wherein the configuration property value is associated with a predetermined time period during which the user is indicated as being a late-stage receiver.

* * * * *